United States Patent [19]

Spurgeon

[11] 4,234,102
[45] Nov. 18, 1980

[54] APPARATUS FOR MEASURING AND DISPENSING CONSTANT WEIGHT PORTIONS OF MATERIAL

[75] Inventor: Peter J. C. Spurgeon, Andover, England

[73] Assignee: AMF Incorporated, White Plains, N.Y.

[21] Appl. No.: 969,605

[22] Filed: Jan. 22, 1979

[30] Foreign Application Priority Data

Dec. 16, 1977 [GB] United Kingdom ............... 52462/77

[51] Int. Cl.³ .............................................. B67D 5/08
[52] U.S. Cl. ...................................... 222/55; 222/63; 222/77; 198/505; 131/21 A
[58] Field of Search ...................... 222/52, 55, 63, 77; 198/502, 505; 177/119, 121; 406/19, 31; 131/21 A, 21 C, 21 D

[56] References Cited

U.S. PATENT DOCUMENTS

| 3,514,217 | 5/1970 | Reiss ..................................... 406/19 |
| 3,978,987 | 9/1976 | Neville et al. ..................... 222/52 X |

FOREIGN PATENT DOCUMENTS 741932 12/1955 United Kingdom .

Primary Examiner—Joseph J. Rolla
Attorney, Agent, or Firm—George W. Price; Charles J. Worth

[57] ABSTRACT

An apparatus for dispensing material, especially tobacco, in portions of predetermined weight from a stream of irregular density. A variable speed feed system passes the material through a measuring region where its density is monitored and the feed speed is automatically adjusted to compensate for measured variation in the density to provide discharge of portions of predetermined weight from the feed system at regularly spaced time intervals. The relative separation positions of the portions may be calculated by determining the weight of each portion from both the density information and the feed speed, separation of the portions being effected when the separation position previously calculated reaches the end of the feed system.

11 Claims, 4 Drawing Figures

APPARATUS FOR MEASURING AND DISPENSING CONSTANT WEIGHT PORTIONS
OF MATERIAL

BACKGROUND TO THE INVENTION

This invention relates to apparatus and method for measuring and dispensing constant weight portions of material especially but not solely of fine-cut long-stranded hand rolling or pipe tobacco for subsequent packing, in particular to means for gauging a stream of tobacco and operating a cut off to produce accurate weight portions without the need for add back.

Such an apparatus has been disclosed and claimed in our British Pat. No. 1,446,583 and comprises means for feeding material through a measuring region, a source of radiation and a radiation detector positioned adjacent and on opposite sides of said measuring region for producing a signal representative of the flow rate of said material through said measuring region, means for integrating said signal with respect to time to give a value proportional to the total weight of material which has been fed through the measuring region, means for separating the material which has been fed through the measuring region from the remainder thereof, and means for initiating the separation after said integrated value reaches a value corresponding to said predetermined weight.

The separated portions of material are discharged from the measuring region at irregular intervals due to the variation in the density of the material being fed to the measuring region. In order to accommodate this irregularity, a conveyor system (see item 152 of 1,446,583) which delivers the cut portions to a packing machine is provided with a series of trucks which are carried by pawls which automatically engage and disengage the trucks. The pawls are positioned at regular intervals along the chain which is driven by the packer so that the arrival of the trucks at the packer where they tip their contents, is synchronised with the packing movement. In order to accommodate irregular timing of the delivered portions, the trucks are disengaged from the pawls on the chain at a filling point and are moved after filling to a position where they re-engage the pawls. This requirement for disengagement and engagement of the trucks on the pawls necessitates complexity in the design of the conveyor.

OBJECT OF THE INVENTION

It is therefore an object of the invention to provide an apparatus for measuring and dispensing constant weight portions in which the discharge of the portions is effected at regular timed intervals. In this way the portions may be transferred to a packer in synchronised movements either by way of a stepwise or continuously moving endless conveyor or direct to the packer.

SUMMARY OF THE INVENTION

According to the invention there is provided an apparatus for dispensing material in portions of predetermined weight from a stream of said material of irregular density, comprising feed means for feeding material through a measuring region, variable speed driving means coupled to said feed means, density determining means for continuously measuring the density of material passing through said measuring region, and speed control means for controlling the speed of said driving means to compensate for variation in the measured density of the material to provide discharge of the portions of predetermined weight from said feed means at regularly spaced time intervals.

Further according to the invention there is provided a method of dispensing material in portions of predetermind weight from a stream of material of irregular density comprising feeding the material through a measuring region, continuously determining the density of the material passing through the measuring region, and controlling the rate at which the material is fed through the measuring region to compensate for variations in the measured density to provide discharged portions of predetermined weight at regularly spaced time intervals.

BRIEF DESCRIPTION OF DRAWINGS

The invention will now be described by way of example with reference to the accompanying drawings, in which.

DESCRIPTION OF PREFERRED EMBODIMENT

Figure 1:
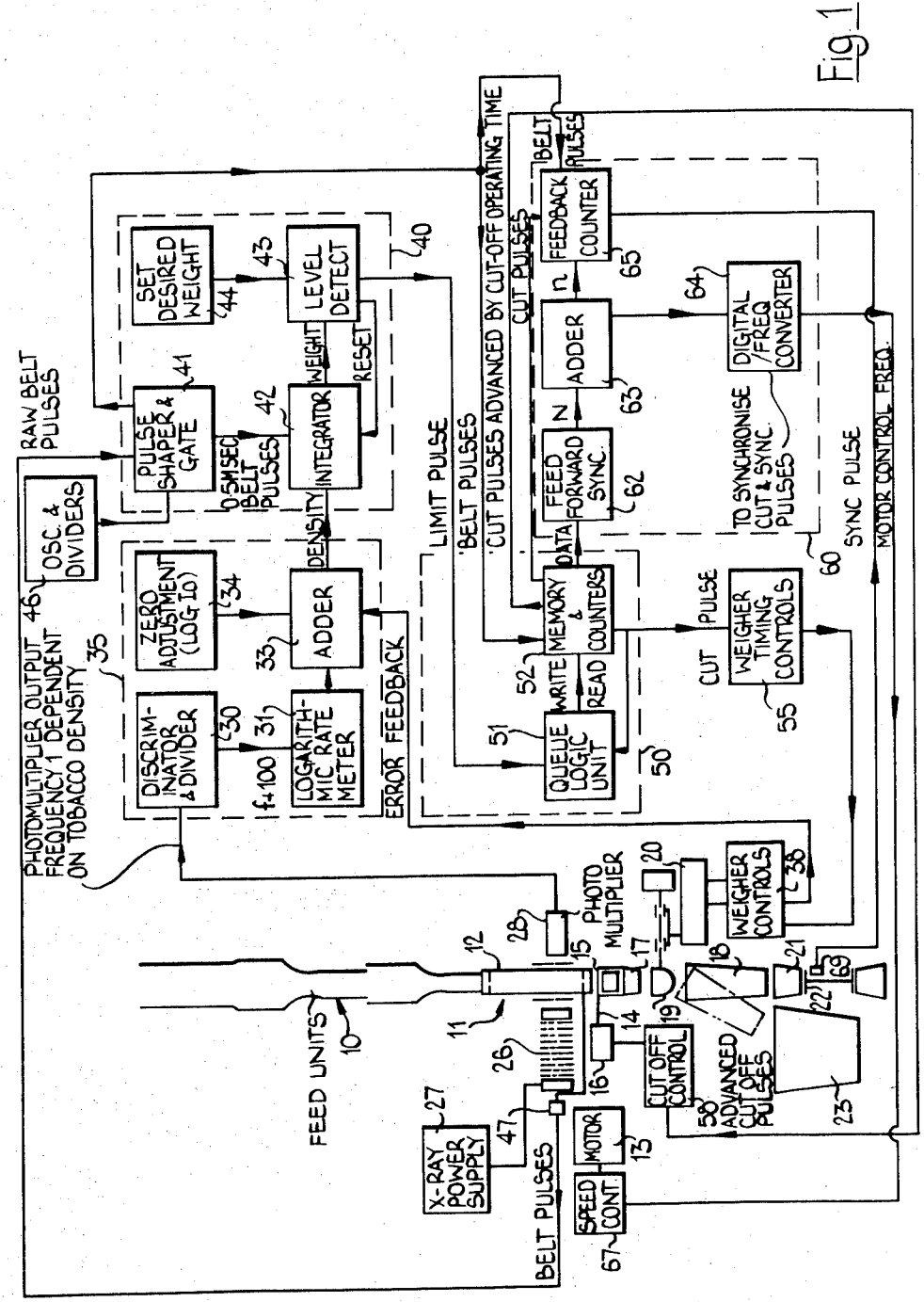
FIG. 1 is a schematic diagram of the apparatus including a circuit in block form of the electronic control therefor.

The stream of tobacco can be produced by various known means such as the feed units described in our British Patent Specification No. 1,418,016 which has as its object the formation of a particularly small cross-section stream with the minimum of degradation of the strand length. Such a feed unit is shown schematically by reference number 10 in FIG. 1.

The stream is then conveyed through a vertical axis rectangular cross-section gauging or measuring tube 11 comprising two fixed walls and two movable walls opposite one another. The two movable walls are each formed by a moving toothed belt 12 driven by a variable speed motor 13 which belts serve to convey the tobacco stream through the tube 11.

Below the lower end of the measuring tube 11 is situated a horizontally slidable carrier 14 which carries a double edged knife 15 for cutting the stream of tobacco. The knife and carrier can be reciprocated by means of a double acting air cylinder 16. Cut tobacco falls from a chamber 17 into the pan 19 of a check weigher 20. After weighing, the cut portions of tobacco may be discharged through a chute 18 into one of a number of trucks 21 for transfer by means of a conveyor 22 to a packing machine (not shown). Alternatively, the portions may be discharged direct into a packing machine. Reject portions from weigher 20 are passed via chute 18 to a reject bin 23.

Mounted adjacent the measuring tube 11 is an X-ray tube 26 energised from a power source 27. On the opposite side of the tube 11 is arranged a photo multiplier tube 28 which receives the X-rays attenuated by absorption in the tobacco passing through the measuring tube 11. Pulses from the multiplier tube pass via a discriminator and divider 30 to a logarithmic rate meter 31 within density module 35, the analogue output of which rate meter is connected to a first input of an adder circuit 33 which subtracts the signal received at a second input from a standard radiation count generated as a preset d.c. signal in unit 34. This standard radiation count is equivalent to the situation when no tobacco is present (i.e. no absorption). The adder 33 adds or subtracts a weight error correction signal received at a third input from the weigher controls 38 of the check weigher 20.

A signal proportional to density is produced at the output of the density module 35 (i.e. at the output of adder 33). An example of such a module is described in British Patent Specification No. 1,446,583. The density signal output of the adder 33 is fed to a limit pulse module 40 comprising essentially a pulse shaper and gate 41, an integrator 42 and a comparator 43, presettable by means of unit 44.

Belt pulses are produced by a generator 47 which may comprise for example a light source, slotted disc and phototransistor which produces pulses at a rate dependent on the speed of the belt 12. These belt pulses are received at one input of pulse shaper 41 at a frequency between 0–2,000 Hz, typically 1,200 Hz, and are shaped within pulse shaper and gate 41 for output to other parts of the system. The width of these belt pulses is standarised to 0.5 msec (or 1 msec or 0.2 msec if selected) within pulse shaper 41. This is effected by means of the oscillator and divider block 46, which includes a crystal controlled oscillator having an output connected to a presettable divider (e.g. a presettable down counter). The stable pulses (within 0.1% over a wide temperature range) from the oscillator are divided down by the preset divider and used to enable the gate within pulse shaper 41 and produce a pulse of 0.5 msec each time a belt pulse is received. Thus if the oscillator frequency is 1 MHz by setting the dividers to divide by 200 then 0.5 ms pulses will be produced.

The analogue density signal from the output of module 35 is received by one input of integrator 42 and is gated by way of a transmission gate within integrator 42 with the 0.5 msec belt pulses from pulse shaper 41.

The integrator thus receives a signal having a voltage proportional to the instantaneous tobacco density and also "belt pulses" which are at a frequency proportional to the tobacco speed. By integrating the density analogue over each 0.5 msec period (i.e. the duration of each belt pulse) a rising voltage output is obtained which is proportional to the weight of tobacco which has passed the photomultiplier 28. This output is fed to a level detector 43 (e.g. a comparator) which compares this rising voltage with a steady-analogue voltage applied to a second input from block 44. The voltage at the second input represents the desired weight value.

Each time the desired weight is reached, detector 43 produces a limit pulse and also resets integrator 42. The limit output pulses from module 40 are fed to the queue module 50 comprising a queuing logic unit 51 and memories and counters unit 52.

The primary function of the queue module is to delay the limit pulse for a preset number of belt pulses corresponding to the number of belt pulses occurring between the tobacco sensing position and the cut-off position. A 'cut pulse' is output each time a limit pulse reaches the cut position. Provision is made for storing information for up to eight tobacco weighments which may be present between the sensing position and the cut off position.

Queue logic unit 51 controls the memories and counters within unit 52. Belt pulses are received by a counter within unit 52 and each time a limit pulse is received by logic unit 51 this logic unit causes the belt pulse count to be written into one of the memory addresses. Down counters within block 52 are preset to the queue length (i.e. the number of belt pulses occuring between the sensor and cut off positions). When this number of belt pulses have been received a cut pulse is produced. The cut pulse is fed back to logic unit 51 and also passes to a weigher timing control 55 which timing control sets the weigher control 38 to weigh the cut tobacco. In addition to the true cut pulse, provision is made within counter block 52 to provide an advanced cut pulse which takes into account the time required to operate the cutter mechanism. This advanced cut pulse will be advanced by a pre-set time so that cut off occurs at the "true cut pulse" moment in time. The advanced cut pulses are received by cut-off contol 58 which comprises electro-pneumatic circuits for selecting the correct cut direction and for operating air cylinder 16.

The cut pulse sent back to logic unit 51 causes this unit to send a read signal to the memory within unit 52 such that data on the number of belt pulses in the next weighment is fed out to motor speed control module 60. A more detailed explanation of a particular embodiment of the queue module 50 is given below with reference to FIGS. 2 and 3.

The speed control module 60 (to be explained in more detail with reference to FIG. 4), comprises a feed forward unit 62, an adder 63, a frequency converter 64 and a feed back counter 65.

Data fed to the input of feed forward sync block 62 representing the pulse number in the next weighment (i.e. the 'length' of the weighment) may be in the form of binary coded decimal pulses (BCD). Sync block 62 converts this from serial to parallel data form and stores this number (N) until reset by the next weighment number entering at its input. The output is continuously available to the adder 63 which also receives a correction count (n) from the output of feedback counter 65. This correction count (n) is the number of belt pulses received at the input of counter 65 in the time interval between the leading edge of the cut pulse and the synchronising pulse whichever occurs first and subsequent alternate intervals. The sync pulses are produced by a proximity sensor 69 associated with the bucket conveyor 22 which sensor produces a pulse each time a bucket 22 reaches a predetermined position relative to the tobacco cut off position. Counter 65 counts down if the cut pulse arrives first or counts up if the sync arrives first. The digital adder 63 continuously calculates and produces an output equal to N±n (in parallel BCD).

The output of adder 63 is received by converter 64 which converts the digital number to a frequency which is output to a 3 phase speed control 67 which controls the speed of the motor 13 and hence the belt speed in dependance on the incoming frequency. The motor is selected to be of a type capable of rapid acceleration/deceleration to a revised speed relative to the machine cycle time.

The motor speed control module will be described in more detail below with reference to FIG. 4.

Thus the number of belt pulses in the next portion of tobacco is used to compute the frequency to be output to control the belt drive motor. The belt speed is therefore caused to be proportional to the distance that the next portion of tobacco has to travel so that the time taken for each portion to be discharged will be constant. This time will be set to match the cycle time of the tobacco packing machine.

By adjusting this belt speed to cause the cuts to occur in synchronisation with the 'sync' pulses, the machine will be gradually brought into synchronisation with the packer at startup, will also correct for regular changes of packer speed and will correct for any small error in the cycle time setting.

Figure 2:
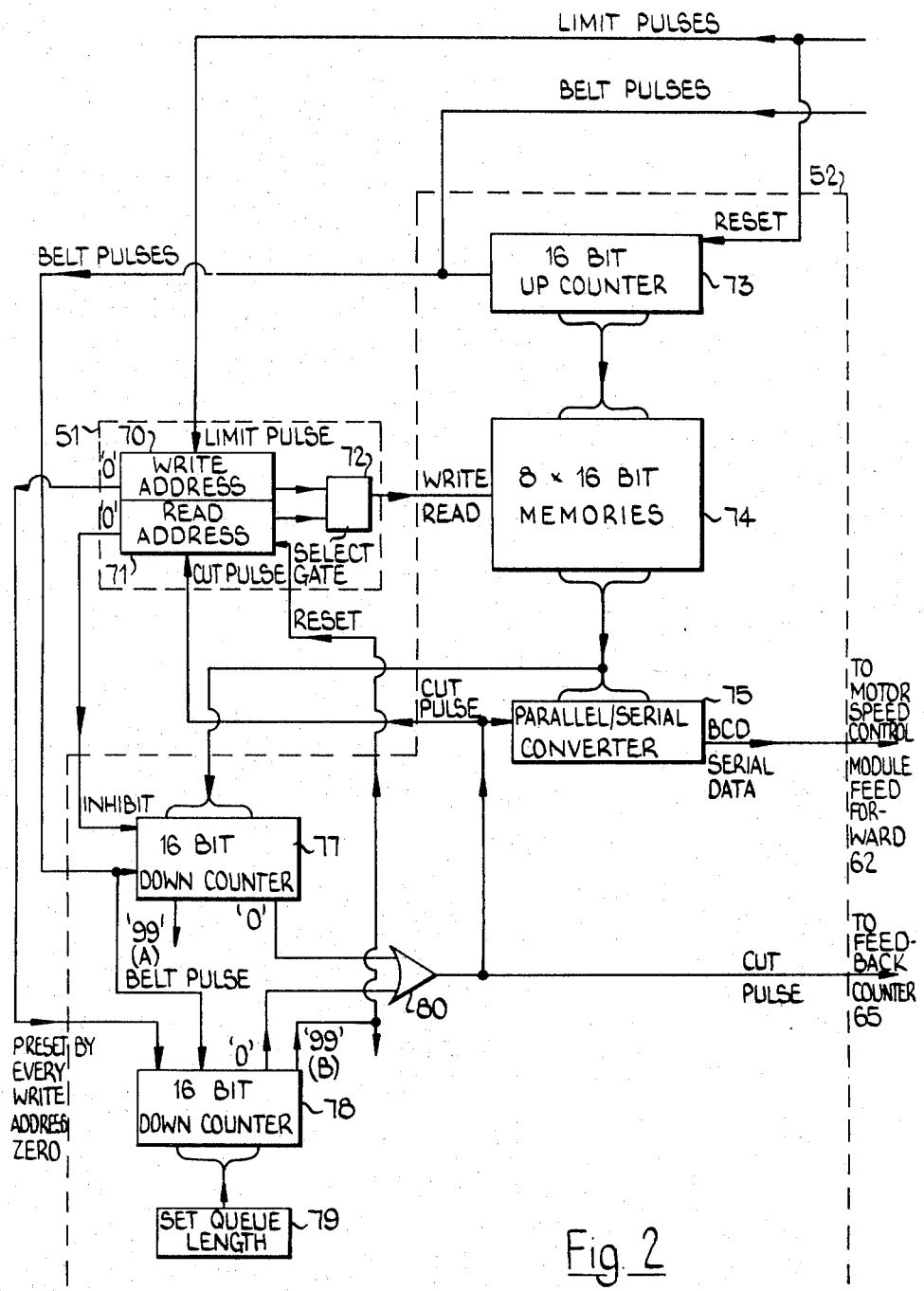
FIG. 2 is a block diagram of the queue module forming part of the circuit of FIG. 1 and shown in greater detail.
Figure 3:
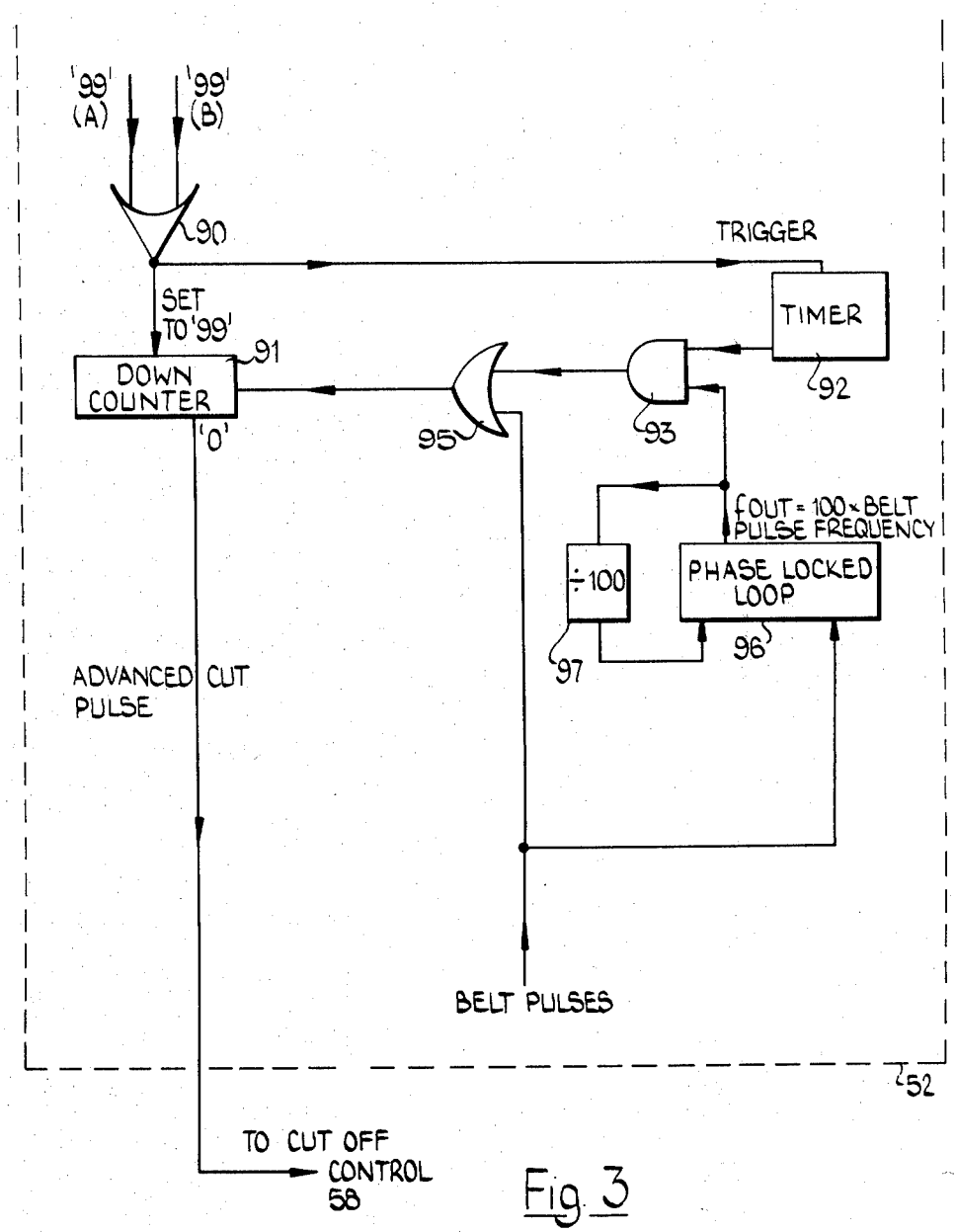
FIG. 3 is a further block diagram of the queue module referred to in FIG. 1.

A suitable configuration for queue module 50 is shown in FIGS. 2 and 3. The part of the module mainly concerned with the production of the cut pulses and the data on weighment 'length' is shown in FIG. 2 and the part of the module concerned with production of 'advanced' cut pulses is shown in FIG. 3.

With regard to FIG. 2, the limit pulses received by queue logic block 51, are applied to a 'write' address counter 70.

Cut pulses are applied to a 'read' counter 71 (e.g. type 4520) and advance the 'read' address before operating the 'read' instruction thus the 'read' address will be one digit advanced compared with the 'write' address which the 'limit' pulse implemented. When a limit pulse is received a write enabling signal is applied via a select gate 72 (e.g. type 4019) to one of the 8 memories within unit 52 (e.g. 4× type 4036). Each time a limit pulse is received the write address will be changed so that a different memory will be accessed. Cut pulses are preferably delayed by means of a 100 KHz clock system (not shown) to prevent the write and read operations occuring simultaneously. The data entered into memory 74 is applied as a 16 bit word from up-counter 73 (e.g. 2 type 4518). This data represents the number of belt pulses received for that weighment. Counter 73 will be reset when the next limit pulse occurs. The data present at the output of memory block 74 represents that associated with an earlier weighment and will be available in dependance on which sequential read address has been selected. The "write" and "read" addresses are both started at address '0' so that the first limit pulse writes into address '0' and the first cut pulse originates from down counter 78 whilst the read address is '0'. Subsequently whenever the down counter 78 reaches count '99' the read address should be at address '0'. If this is not the case it is reset to address '0'. Also when the read address is '0' counter 77 is prevented from producing a cut pulse. The cut pulse advances the read address and then the 16 bit parallel data at the memory output is converted into serial form by converter 75 (e.g. 2 type 4034) and is fed to the feed forward unit 62. The cut pulse is also fed to feedback counter 65 and also clocks read address counter 71 to select the next address for read out (see FIG. 1). To generate a cut pulse other than those originating at address '0', the weighment data is applied to the input of down counter 77 (e.g. 2×40102). The down counter receives belt pulses and will count down from the number entered from the memory to produce a cut pulse when zero is reached. This cut pulse will be produced at the time that this weighment has reached the cut off position. Cut pulses for address '0' are produced by a second 16 bit down counter 78 (e.g. 2×40102) and cut pulses from either counter are used via OR gate 80. The counter 78 is preset by queue length switches 79 to the number equivalent to the belt pulses which will occur between the sensing and cut off positions. This queue length can be up to 8 times the weighment 'length'.

The counts 99(A) and 99(B) from counters 77 and 78 respectively are used to provide the 'advanced' cut pulse now described with reference to FIG. 3.

The '99' count pulse from counters 77 or 78 (a signal corresponding to counter reaching number 99) is applied to a down counter 91 (e.g. 40102) via OR gate 90 which sets the counter to '99'. The counter 91 counts down each time a belt pulse is received so that on reaching zero an 'advanced' cut pulse is generated. These belt pulses are received via OR gate 95. If only belt pulses were received by counter 91 then the cut pulse would not be advanced. To provide this advance, additional clock pulses are applied to counter 91 via the other input of OR gate 95 so that zero is reached more quickly. These additional pulses are provided by a voltage controlled oscillator (VCO) within phase locked loop 96 (e.g. type 4046). The phase locked loop includes the VCO and phase comparator in known configuration. The output frequency is selected to be 100 times the belt pulse frequency. This frequency is divided by 100 in divider 97 (e.g. type 40102) and applied to the phase comparator for comparing with the belt pulse input. Any phase difference causes the voltage controlling the VCO frequency to be altered so as to pull back the frequency to exactly 100 times the belt pulse frequency. Thus although the belt pulse frequency may vary, the oscillator output will always remain at 100 times this variable frequency. The oscillator output frequency is gated via AND gate 93 under the control of timer 92 so that pulses from the VCO will only be passed to counter 91 when timer 92 (e.g. type 555) is timing out. The time period of timer 92 is preset (by external resistor/capacitor selection) to be exactly 1/100th of the cut time, where the cut time is the time taken for the blade to be brought into cutting operation. Thus when timer 92 is triggered by output of OR gate 90, the timer enables gate 93 for 1/100th of the cut time so that pulses from the VCO are applied to counter 91 during this period.

These pulses are in addition to the belt pulses so that down counter 91 reaches zero and produces the cut pulse in advance so that the blade is actuated to cut the tobacco at the correct moment in time regardless of the variation in belt speed.

Figure 4:
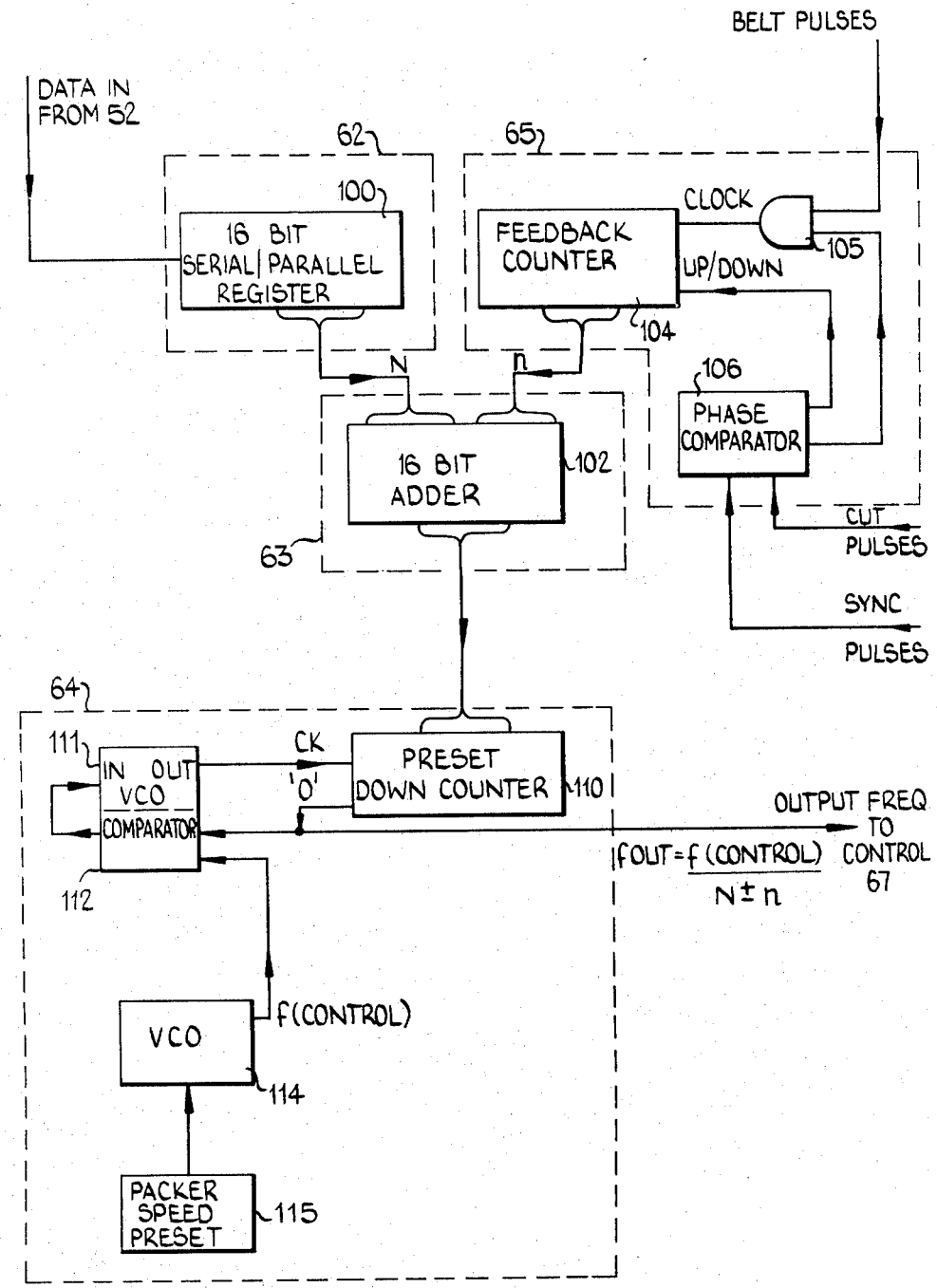
FIG. 4 is a block diagram of the motor speed control module also in more detail than is shown in FIG. 1.

The motor speed control module is shown in more detail in FIG. 4. The feed forward sync block 62 comprises a 16 bit serial/parallel register (e.g. 2×4034) which receives the serial data on the next weighment and converts this to parallel form where it is held for read out till undated by the next block of serial data. This number N is added in block 63 with correction count n from feedback counter block 65. Adder block 63 comprises a 16 bit adder (e.g. 4×14560).

The feedback counter block 65 comprises a 16 bit feedback counter 104 (e.g. 4×4029), AND gate 105 and phase comparator 106. Phase comparator 106 receives cut pulses and sync pulses at its inputs. The phase of an incoming cut pulse will be compared with a sync pulse. The counter 104 will be set by the comparator to count up or down depending on whether a sync pulse or a cut pulse is received first. By comparing the leading edges of each pulse, AND gate 105 can be enabled for the period that occurs between arrival of the pulse leading edges so that counter 104 counts up or down by the number of belt pulses received during this period, so that the number of belt pulses counted will be proportional to the time between the leading edges of the snyc and cut pulses.

The sum of N±n will be provided at the output of adder 102 which sum is received by converter block 64. This block comprises a voltage controlled oscillator 111 and comparator 112 (e.g. 4046) a preset down counter 110 (e.g. 2×40102), a second VCO 114 and a packer speed setting control 115. VCO 114 (and comparator 106) can conveniently be formed from chip type 4046.

The output of adder 102 is used as the preset number for down counter 110. The output of oscillator 111 is used to clock the counter down to zero. The rate at which the down counter produces a zero count is used as the output frequency. The voltage controlling VCO 111 is provided by the output of phase comparator 112 which compares the frequency produced at the down counter output with a control frequency produced by the second VCO 114. The frequency of VCO 114 is set by a voltage produced by setting control 115 which is preset to the packer speed. Thus the output frequency from converter 64 is equal to control frequency of VCO 114 divided by $N\pm n$ so that the cut pulse will be provided at the correct time when a truck 21 on the conveyor 22 (see FIG. 1) is ready to receive the weighment.

The circuit blocks for the various modules described (see FIG. 1) could be provided by alternative arrangements to those described.

Log rate meter 31 could be formed from an analogue rate meter in conjunction with a log amplifier. Rate meter 31 could alternatively be in digital form with a digital adder to provide a frequency output.

The integrator 42 could be replaced by a digital counter. Level detector 43 could be a counter with a zero detect output. The counter would be preset by binary coded switches rather than by an analogue signal from block 44.

Alternatively the entire function of blocks 35 and 40 could be handled by a micro-processor.

Queue module 50 could operate erroneously if the number of pulses in a weighment exceeded the preset queue length of block 79. This could occur if the product flow was interrupted. To overcome this an output signal could be obtained from counter 73 when it reached a number just below the preset queue length. This output signal, if used to reset the counters 70 and 71 to write address '0' and read address '0' would prevent any further cut pulse outputs originating from block 77 until a limit pulse advances the write address.

Queue module 50 could use separate counters for counting the number of pulses in each weighment. For sequencing, shift registers could be used to provide a delayed limit pulse, delayed by the number of pulses between the sensing and end of belt positions.

Density data from module 35 could be delayed and used as an analogue signal for feed forward sync unit 62 of speed control module 60.

Alternatively the entire functions of blocks 50 and 60 could be handled by a micro-processor.

The manual setting of packer speed preset block 115 could alternatively be eliminated by means of a phase locked loop producing a control frequency into down counter 110 equal to cumulative feed-back error count from block 104 (n') multiplied by sync pulse frequency and inputting N directly to preset down counter 110. There will then be an output frequency defined by $$f\text{out} = \frac{n' \cdot f\text{sync}}{N}$$

Although the specific embodiment has been described as handling tobacco, the invention is applicable to the measuring and dispensing of any material having a variable density which can be caused to flow. In a further particular example the apparatus may measure portions of dough, the measured portions being dispensed from the outlet at regularly spaced time intervals.

I claim:

1. Apparatus for dispensing material in portions of predetermined weight from a stream of said material of irregular density, comprising:

feed means for feeding material through a measuring region;

variable speed driving means coupled to said feed means;

density determining means for continuously measuring the density of material passing through said measuring region;

speed control means for controlling the speed of said driving means to compensate for variation in the measured density of the material to provide discharge of the portions of predetermined weight from said feed means at regulatly spaced time intervals;

signal generator means for producing a signal representing the speed of travel of said feed means; weight determining means for producing a signal indicative of weight in dependence on the outputs of the density determining means and the speed signal generator means; comparator means for comparing the weight of the portions to provide a position signal representing the position of separation of said portions; separator means positioned adjacent the discharge end of said measuring region for effecting separation of said portions in sequence as they arrive at the separation position; and delay means for producing a delayed output under the control of the position signal to actuate said separation means at the moment the appropriate portion arrives at the separation position;

said speed control means including an error detector for determining ay time error between the actuation of said separator means and the presence of receiving means at the measuring region to provide additional speed control of the driving means in dependence on the error detected.

2. Apparatus according to claim 1, wherein the weight determining means comprises an integrator having a first input for receiving said speed signal in the form of a pulse stream having a frequency proportional to the speed of the feed means and a second input for receiving the density signal from said density determining means, said integrator only effecting integration during the presence of each pulse, and wherein the integrator receives the speed signal pulse stream via a pulse shaper which provides pulses of predetermined width for said integrator.

3. Apparatus according to claim 1 wherein weigher means are provided to weigh each discharged portion of said material and to provide a feedback signal for said density determining means indicative of any detected weight error.

4. Apparatus according to claim 3 wherein said density determining means comprises a source of radiation and a detector located adjacent the measuring region for determing the amount or radiation unattenuated by the passing material in said measuring region, and corrector means for determining the density of the material from both the detector output and the weight error from said weigher means.

5. Apparatus according to claim 1, wherein said delay means comprises a memory for storing the separation position information for a plurality of portions until each portion is adjacent the separation position.

6. Apparatus according to claim 5 wherein the delay means includes a counter for determining the time delay for the memory in dependence on a predetermined number of pulses derived from said signal generator indicative of the distance travelled between the sensing and separation regions.

7. Apparatus according to claim 6 wherein the delay means includes a second counter to provide a signal for actuating said separation means at a predetermined time prior to the arrival of a respective portion to allow for the operation delay of said separation means.

8. Apparatus according to claim 7 wherein a variable frequency oscillator is provided to produce additional pulses for said second counter to effect advanced actuation of said separation means, the frequency of said oscillator being varied in dependence on the variation in the speed of said feed means.

9. Apparatus according to claim 5, wherein the delay means includes a portion counter for counting the number of pulses derived from the speed signal generator occurring during the passage of the measured portion indicative of portion length, the output of said portion counter being stored in an address within the memory for retrieval when that particular portion approaches the separation position.

10. Apparatus according to claim 9 wherein the speed control means includes an adder for adding the output data from said memory indicative of portion length with data from said error detector indicative of any time error between actuation of said separation means and the presence of the receiving means to provide a corrected signal and converter means for converting the corrected signal into a frequency for controlling the speed of said driving means.

11. Apparatus according to claim 10 wherein the data from said memory indicative of portion length is held in a register for use by the adder and the error detector includes a counter for determining the number of pulses derived from the speed signal generator occurring between the actuation of the separator means and the presence of the receiving means.

* * * * *